United States Patent [19]
Egawa et al.

[11] Patent Number: 5,696,787
[45] Date of Patent: Dec. 9, 1997

[54] LASER OSCILLATION APPARATUS

[75] Inventors: Akira Egawa; Michinori Maeda; Yoshitaka Kubo, all of Yamanashi, Japan

[73] Assignee: Fanuc Ltd., Yamanashi, Japan

[21] Appl. No.: 514,156

[22] Filed: Aug. 11, 1995

Related U.S. Application Data

[63] Continuation of Ser. No. 146,176, filed as PCT/JP93/00311, Mar. 15, 1993 published as WO93/20603, Oct. 14, 1993, abandoned.

Foreign Application Priority Data

Mar. 30, 1992 [JP] Japan .................. HEI-4-74757

[51] Int. Cl.⁶ .................................................. H01S 3/081
[52] U.S. Cl. .................................. 372/93; 372/99
[58] Field of Search ............................ 372/93, 99

[56] References Cited

U.S. PATENT DOCUMENTS

| | | | |
|---|---|---|---|
| 3,404,349 | 10/1968 | Rigrod | 331/94.5 |
| 4,740,986 | 4/1988 | Reeder | 372/93 |
| 4,891,820 | 1/1990 | Rando et al. | 372/93 |
| 4,977,574 | 12/1990 | Karabe | 372/93 |
| 5,052,017 | 9/1991 | Hobart et al. | 372/93 |
| 5,148,443 | 9/1992 | Du et al. | 372/93 |

FOREIGN PATENT DOCUMENTS

| | | |
|---|---|---|
| 0285 397 | 10/1988 | European Pat. Off. . |
| 37 22 256 | 1/1989 | Germany . |
| A 59-68983 | 4/1984 | Japan . |
| Y2 | 7/1985 | Japan . |
| B2 3-76793 | 12/1991 | Japan . |

*Primary Examiner*—Rodney B. Bovernick
*Assistant Examiner*—Robert E. Wise
*Attorney, Agent, or Firm*—Staas & Halsey

[57] ABSTRACT

An external optical system is simplified in construction so that a laser oscillation apparatus is low-priced and compact as a whole. On the side of one end portion (10A) of a return-type resonator (10), a laser beam is reflected by a polarizing mirror (147) to be incident upon a polarizing mirror (146) which is situated diagonally below the mirror (147), and is also reflected by a polarizing mirror (142) to be incident upon a polarizing mirror (141) which is situated diagonally above the mirror (142). Thus, at the one end portion (10A), the polarizing mirror (141) and the like are arranged so that optical axes cross each other. Since the emitted laser beam forms a linear polarized beam inclined at an angle of 45° to a horizontal plane, as indicated by arrow (100), the laser beam can be subjected to circular polarization by using only one ¼-wavelength mirror. Thus, the construction of the external optical system can be simplified. Since the optical axes cross each other at the return side, moreover, the construction can be made compact as a whole.

10 Claims, 7 Drawing Sheets

LASER OSCILLATION APPARATUS

This application is a continuation of application Ser. No. 08/146,176, filed Nov. 12, 1993, now abandoned.

BACKGROUND OF THE INVENTION

1. Field of the Invention

The present invention relates to a laser oscillation apparatus in which a laser beam is emitted from a return-type resonator, and more particularly, to a laser oscillation apparatus in which an external optical system can be simplified in construction.

2. Description of the Related Art

A gas laser oscillation apparatus such as a $CO_2$ gas laser, which can highly efficiently produce a high output, is now widely used in the field of laser machining.

In the case of the $CO_2$ gas laser, $CO_2$ molecules for use as a laser medium are excited by electric discharge inside a resonator. In doing this, input power is restricted by the yield strength of members constituting an exciter unit and an increase in temperature of gas produced by the excitation. Further, the diameter of an output beam must be increased on account of restrictions on the light-resistance of an output mirror. For these reasons, the optical path length of the resonator must be increased for a higher output, so that the whole apparatus is inevitably increased in size. To cope with this, many of laser oscillation apparatuses are arranged so that the optical axis of the resonator is returned in a multistage fashion, thereby reducing the length of the laser oscillation apparatus.

FIG. 7 (PRIOR ART) is a view schematically showing an arrangement of a conventional return-type resonator. Referring to FIG. 7, a resonator 70 comprises an output mirror 71, a rear mirror 72, exciting sections 731, 732, 733 and 734, and polarizing mirrors 741, 742, 743, 744, 745 and 746. All optical axes in the resonator 70 are adjusted so as to be within a horizontal plane. In the resonator 70 having these optical axes, the direction of polarization of a laser beam emitted from the output mirror 71 is a vertical direction at 90° to the horizontal plane, as indicated by arrow 700.

FIG. 8 (PRIOR ART) is a view showing a modification of the conventional return-type resonator. Referring to FIG. 8, a resonator 80 comprises an output mirror 81, a rear mirror 82, exciting sections 831, 832, 833 and 834, and polarizing mirrors 841, 842, 843, 844, 845 and 846. Since optical axes in this resonator 80 is returned three-dimensionally, the resonator 80 is more compact than the resonator 70 of FIG. 7 which has a flat configuration. The direction of polarization of a laser beam emitted from the resonator 80 is a horizontal direction, as indicated by arrow 800.

When using a laser beam as a heat source for cutting metal or the like, a circular polarized beam, for use as the laser beam applied to a workpiece, can provide a better work quality than a linear polarized beam. Usually, therefore, a vertical or horizontal linear polarized beam is subjected to circular polarization by means of a mechanism such as the one shown in FIG. 9.

FIG. 9 (PRIOR ART) is a view showing conventional circular polarization means. A laser beam emitted from a resonator 90 is a vertical linear polarized beam, as indicated by arrow 900. Conversion of this laser beam into a circular polarized beam requires use of a polarizing mirror 95 for 45° linear polarization and a ¼-wavelength mirror 96. The laser beam, converted into the circular polarized beam by the polarizing mirror 95 and the ¼-wavelength mirror 96, is further applied to a workpiece 91 via a condensing lens 98. Although the circular polarization of a vertical linear polarized beam has been described in this case, the same arrangement is applicable to the case where a horizontal linear polarized beam is converted into a circular polarized beam.

Thus, in the conventional laser oscillation apparatus, the two external mirrors 95 and 96 are needed at the least in order to subject the vertical or horizontal laser beam to circular polarization, as shown in FIG. 9. Normally, moreover, the workpiece is placed on a horizontal surface, so that a mirror 97 for bending the laser beam vertically downward is also needed. In other words, at least three external mirrors are necessary. Therefore, the cost of the laser oscillation apparatus is increased correspondingly. Unlike the mirrors in the resonator, these external mirrors are frequently soiled by dust and the like, so that they require maintenance such as parts cleaning. Further, assembling the disassembled parts requires a complicated adjustment of the external optical system.

SUMMARY OF THE INVENTION

The present invention has been contrived in consideration of these circumstances, and its object is to provide a laser oscillation apparatus capable of using a simple, low-priced external optical system and enjoying a compact construction as a whole.

In order to solve the above problem, according to the present invention, there is provided a laser oscillation apparatus for emitting a laser beam from a return-type resonator for returning optical axes in a multistage fashion, characterized in that the optical axes form the four vertexes of a square on a section perpendicular to the longitudinal direction of the optical axes, and the optical axes are returned crossing each other on a return side at one end.

The return-type resonator is arranged so that the optical axes form the four vertexes of the square on the section perpendicular to the longitudinal direction of the optical axes, and the optical axes are returned crossing each other on the return side at the one end. Accordingly, the laser beam emitted from the return-type resonator forms a linear polarized beam inclined at an angle of 45° to the horizontal direction. Thus, an external optical system for circular polarization of laser beams must only includes a ¼-wavelength mirror, for example, so that the construction of the external optical system can be simplified. As a result, the price of the laser oscillation apparatus can be lowered. Since the optical axes are arranged so as to be returned three-dimensionally and cross each other at the one end, moreover, the construction can be made more compact.

DETAILED DESCRIPTION OF THE PREFERRED EMBODIMENTS

One embodiment of the present invention will now be described with reference to the accompanying drawings.

Figure 1:
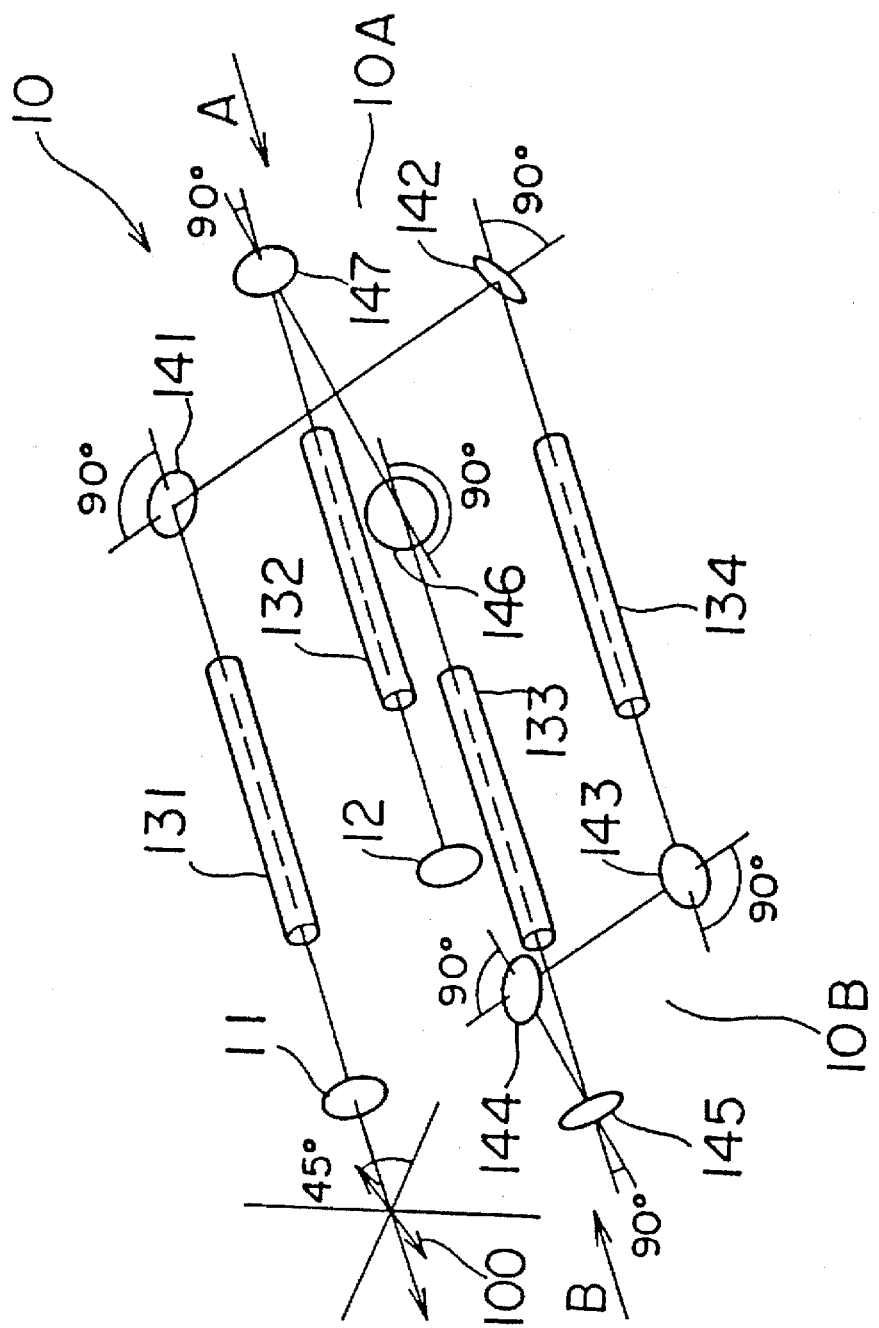
FIG. 1 is a view showing an arrangement of a return-type resonator according to the present invention.

FIG. 1 is a view showing an arrangement of a return-type resonator according to the present invention. Referring to FIG. 1, a return-type resonator 10 comprises an output mirror 11, a rear mirror 12, exciting sections 131, 132, 133 and 134, and polarizing mirrors 141, 142, 143, 144, 145, 146 and 147. Optical axes in this return-type resonator 10 form the four vertexes of a square on a section perpendicular to the longitudinal direction thereof. The following is a description of the arrangement on both end sides of the return-type resonator 10.

Figure 2:
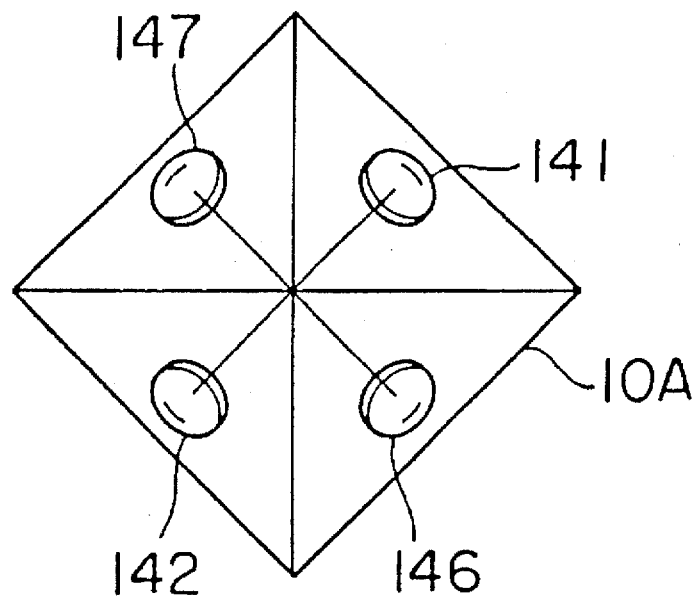
FIG. 2 is a view showing one end portion of the return-type resonator.

FIG. 2 is a fragmentary view taken in the direction of arrow A in FIG. 1, showing one end portion of the return-type resonator. As shown in FIG. 2, the one end portion 10A of the return-type resonator 10 is in the form of a quadrangular pyramid, having the polarizing mirrors 141, 142, 146 and 147 arranged in the center of its slopes, individually. The one end portion 10A constitutes a return side for a laser beam, and the optical axes at the one end portion 10A cross each other, as shown in FIG. 2.

Figure 3:
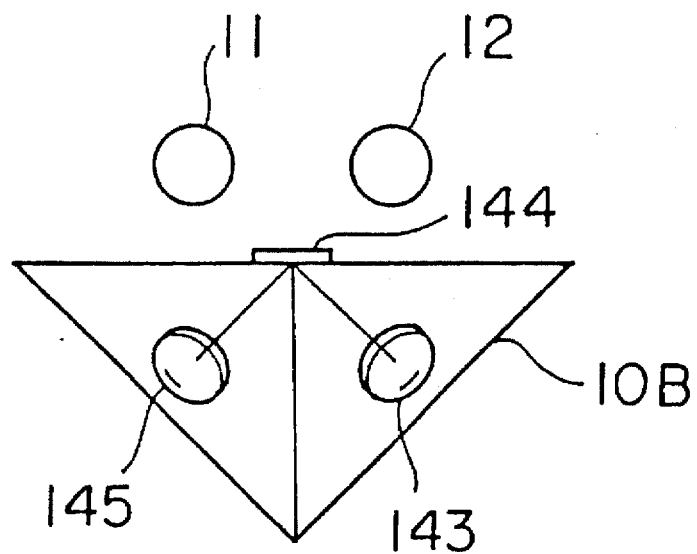
FIG. 3 is a view showing the other end portion of the return-type resonator.

FIG. 3 is a fragmentary view taken in the direction of arrow B in FIG. 1, showing the other end portion of the return-type resonator. As shown in FIG. 3, the other end portion 10B of the return-type resonator 10 is in the form of a triangular pyramid, having the polarizing mirrors 143 and 145 arranged in the center of its slopes, individually, the polarizing mirror 144 on its lateral face, and the output mirror 11 and the rear mirror 12 above.

In the return-type resonator 10 constructed in this manner, the laser beam from the side of the rear mirror 12 is reflected by the polarizing mirrors 147, 146, 145, 144, 143, 142 and 141 in the order named, and is emitted from the output mirror 11. On the side of the one end portion 10A, the laser beam is reflected by the polarizing mirror 147 to be incident upon the polarizing mirror 146, which is situated diagonally below the mirror 147, and is also reflected by the polarizing mirror 142 to be incident upon the polarizing mirror 141, which is situated diagonally above the mirror 142. Thus, at the one end portion 10A, the polarizing mirror 141 and the like are arranged so that the optical axes cross each other, as mentioned before.

On the side of the other end portion 10B, on the other hand, the laser beam is reflected by the polarizing mirror 145 to be incident upon the polarizing mirror 144, which is situated on the lateral face diagonally above the mirror 145, and is further reflected by the polarizing mirror 144 to be incident upon the polarizing mirror 143, which is situated on the slope diagonally below the mirror 144.

The laser beam emitted from the return-type resonator 10, which is a linear polarized beam perpendicular to a plane defined by the polarizing mirrors 143, 142 and 141 and the output mirror 11, forms a linear polarized beam inclined at an angle of 45° to a horizontal plane, as indicated by arrow 100 of FIG. 1.

As the laser beam is reflected successively by the polarizing mirror 141 and the like, moreover, it forms a p polarized beam at the polarizing mirror 144, although it forms an s polarized beam at any of the other polarizing mirrors 141, 142, 143, 145, 146 and 147. Meanwhile, the reflectance of the laser beam reflected by the polarizing mirror 141 and the like is higher when the laser beam is a s polarized beam than when it is a p polarized beam. Thus, a laser beam of 45° polarization with high general efficiency can be obtained.

Figure 8:
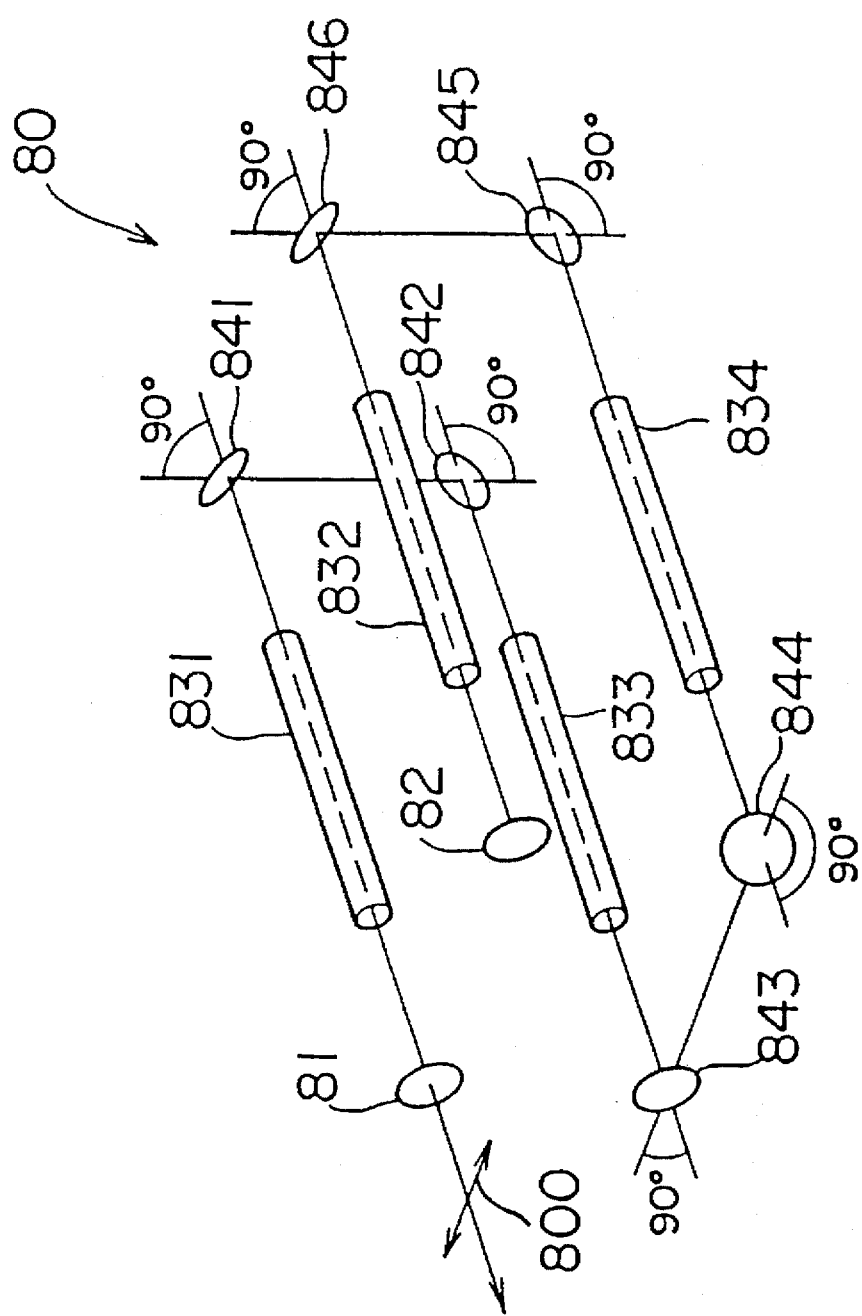
FIG. 8 (PRIOR ART) is a view showing a modification of the conventional return-type resonator.
Figure 9:
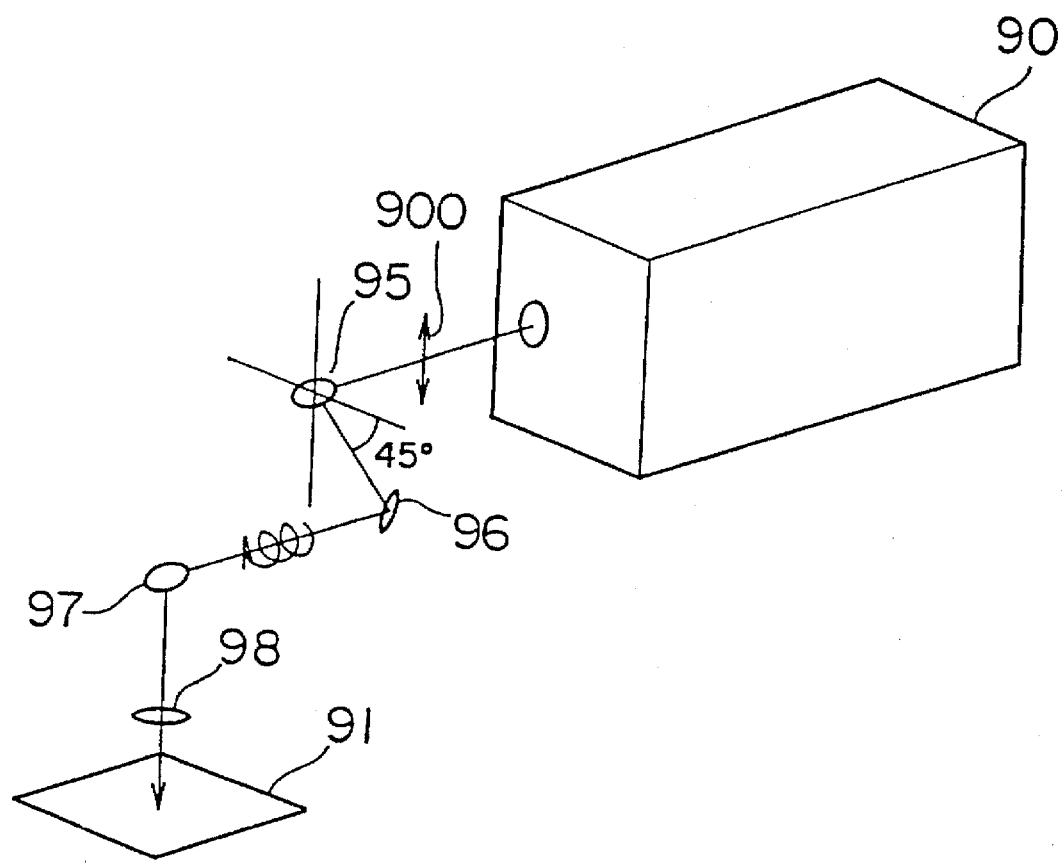
FIG. 9 is a view showing conventional circular polarization means.

Since the optical axes cross each other on the return side, moreover, the distance between the adjacent optical axes can be made shorter than in the case of a conventional three-dimensional resonator, such as the one shown in FIG. 8. Thus, the return-type resonator 10 can be formed having a compact structure.

Figure 4:
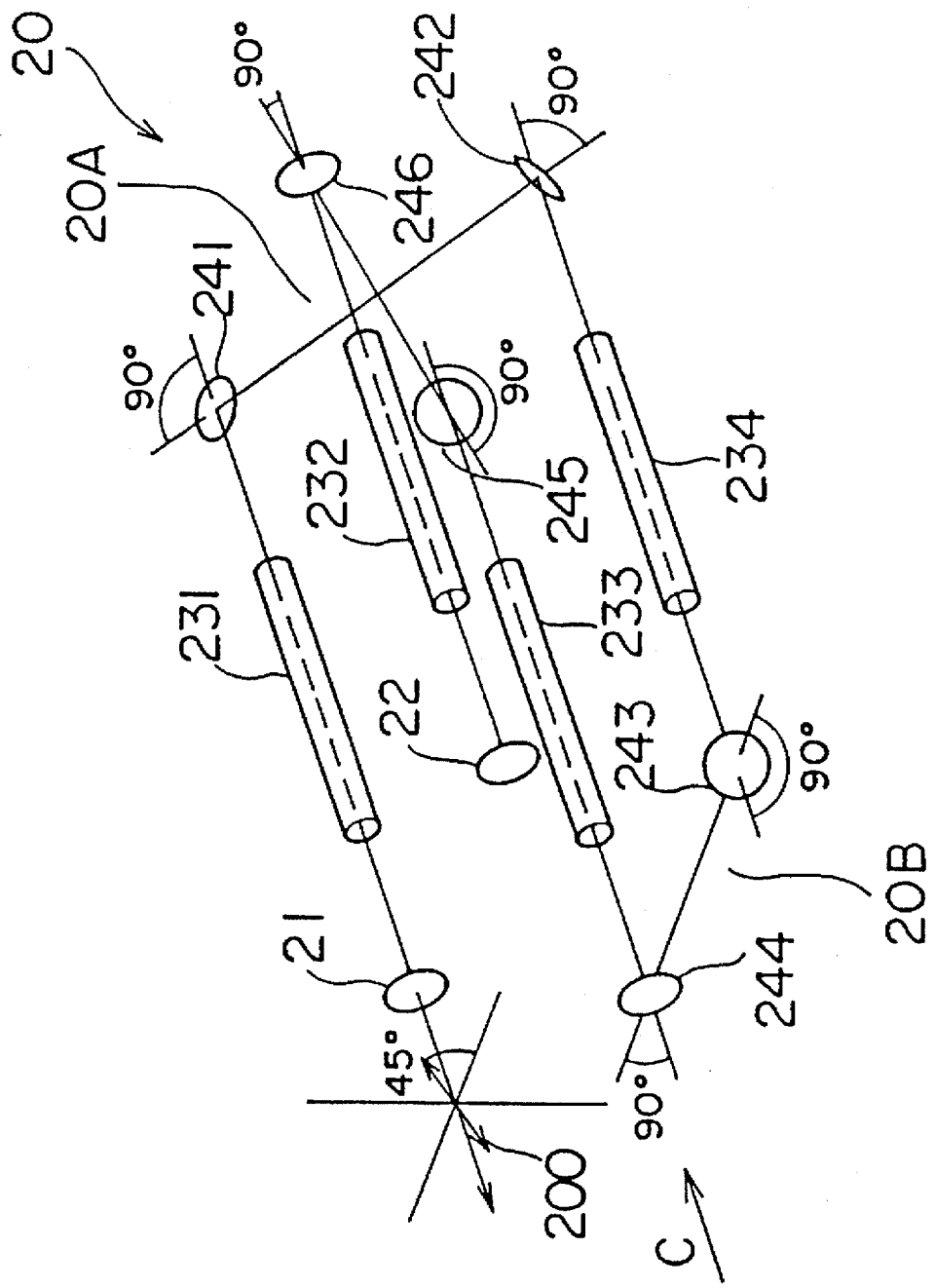
FIG. 4 is a view showing a modification of the return-type resonator according to the present invention.

FIG. 4 is a view showing a modification of the return-type resonator according to the present invention. This is an example obtained by reducing the polarizing mirrors by one in number from the aforementioned return-type resonator 10, that is, a case in which six polarizing mirrors are used for the reflection. Referring to FIG. 4, a return-type resonator 20 comprises an output mirror 21, a rear mirror 22, exciting sections 231, 232, 233 and 234, and polarizing mirrors 241, 242, 243, 244, 245 and 246. One end portion 20A is constructed in the same manner as that of the return-type resonator 10, while the other end portion 20B is constructed in the manner shown in FIG. 5.

Figure 5:
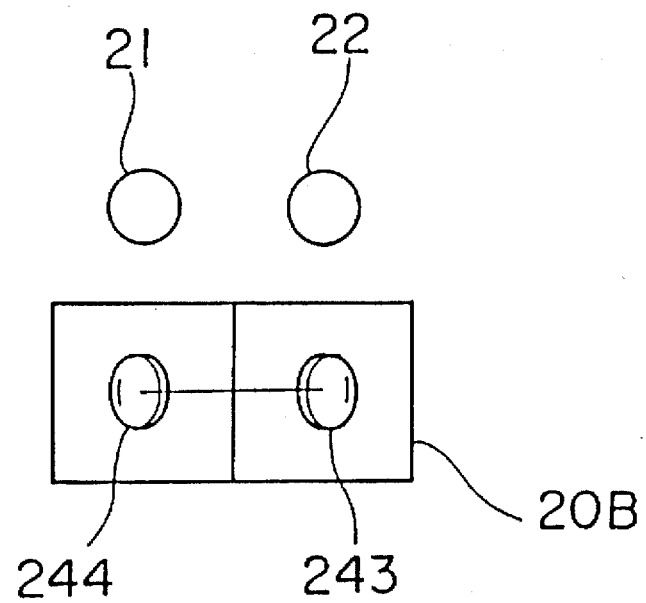
FIG. 5 is a view showing the other end portion of the return-type resonator of FIG. 4.

FIG. 5 is fragmentary view taken in the direction of arrow C in FIG. 4, showing the other end portion of the return-type resonator of FIG. 4. No mirror corresponding to the polarizing mirror 144 of FIG. 1 is provided at the other end portion 20B of the return-type resonator 20, and the laser beam lands on the polarizing mirror 243 immediately after it is reflected by the polarizing mirror 244.

As in the case of the foregoing return-type resonator 10, the laser beam emitted from the return-type resonator 20, which is a linear polarized beam perpendicular to a plane defined by the polarizing mirrors 243, 242 and 241 and the output mirror 21, forms a linear polarized beam inclined at an angle of 45° to a horizontal plane, as indicated by arrow 200 of FIG. 4.

Thus, according to the return-type resonator 20, the linear polarized beam inclined at the angle of 45° can be obtained even though the polarizing mirrors are reduced in number. In the case of the return-type resonator 20, however, the laser beam forms a p polarized beam at the polarizing mirrors 243 and 244, while it forms an s polarized beam at the other polarizing mirrors 241, 242, 245 and 246. Preferably, therefore, mirrors designed so that the difference between reflectances for the p and s polarized beams is very small should be used as the polarizing mirrors 243 and 244 in order to maintain the efficiency of the laser beam.

Figure 6:
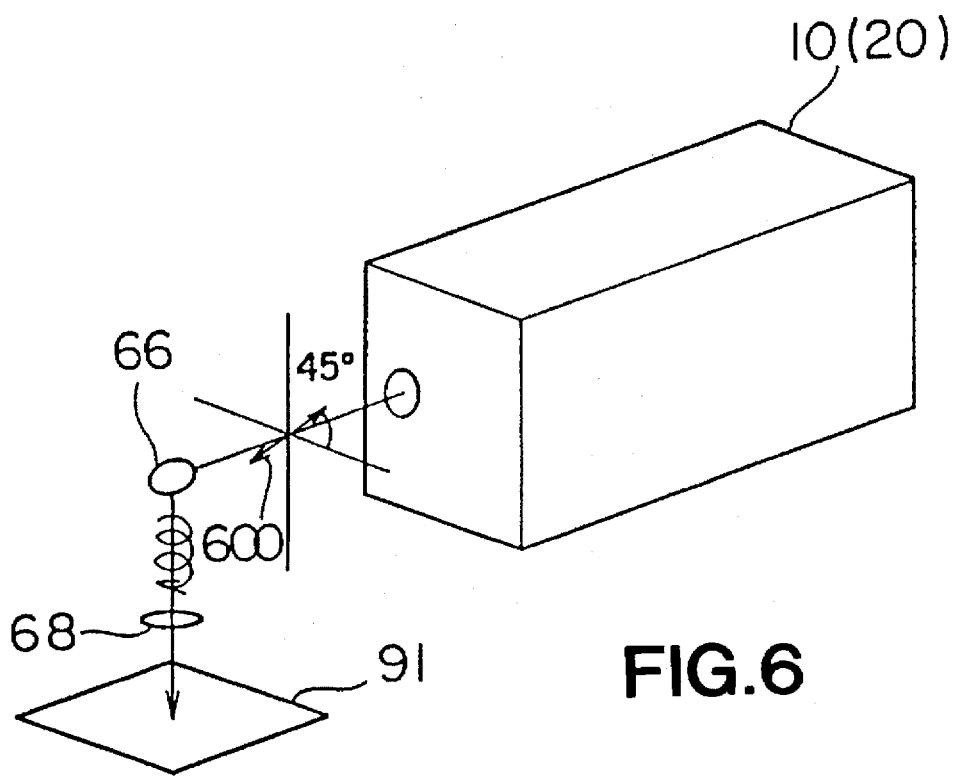
FIG. 6 is a view showing circular polarization means.
Figure 7:
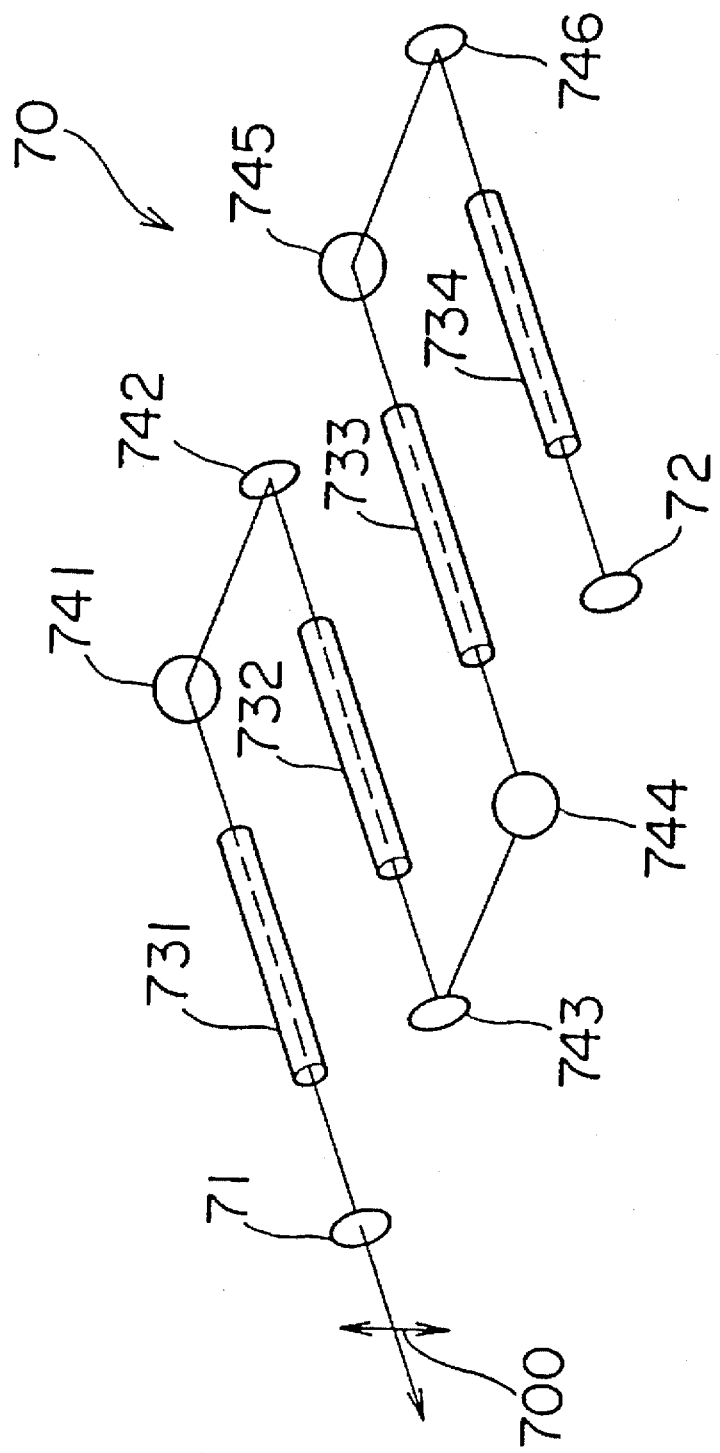
FIG. 7 (PRIOR ART) is a view schematically showing an arrangement of a conventional return-type resonator.

FIG. 6 is a view showing circular polarization means. The laser beam emitted from the aforementioned return-type resonator 10 or 20 is a laser beam which is linearly polarized at an angle of 45°, as indicated by arrow 600. This laser beam is subjected to circular polarization by means of a ¼-wavelength mirror 66, bent vertically downward, and applied to a workpiece 91 via a condensing lens 68.

Conventionally, an external optical system for circular polarization of laser beams requires use of three mirrors, a 45°-direction polarizing mirror, ¼-wavelength mirror, and polarizing mirror for vertical downward bending. According to the present embodiment, in contrast with this, the 45°-polarized laser beam is emitted directly, so that only the single ¼-wavelength mirror 66 is essential. Thus, the construction of the external optical system can be simplified, so that a low-priced laser oscillation apparatus can be obtained. Since the construction of the external optical system can be simplified, man-hours required for parts cleaning, adjustment pertaining to assembling, etc. can be reduced considerably.

According to the present invention, as described above, the return-type resonator of the laser oscillation apparatus is arranged so that the optical axes form the four vertexes of the square on the section perpendicular to the longitudinal direction of the optical axes, and the optical axes are returned crossing each other on the return side at the one end. Accordingly, the laser beam emitted from the return-type resonator forms a linear polarized beam inclined at an angle of 45° to the horizontal direction. Thus, the external optical system for circular polarization of laser beams must only include the ¼-wavelength mirror, for example, so that the construction of the external optical system can be simplified. As a result, the price of the laser oscillation apparatus can be lowered. Since the optical axes are arranged so as to cross each other on the return side, moreover, the construction can be made more compact.

We claim:

1. A laser oscillation apparatus for emitting a laser beam from a return-type resonator, comprising:

one end portion including four polarizing mirrors having optical axes which cross each other and forming four vertices of a square on a section perpendicular to the longitudinal direction of said optical axes, to reflect a laser beam; and an opposite end portion including three polarizing mirrors respectively arranged on three faces of a triangular pyramid, to reflect the laser beam.

2. A laser oscillation apparatus according to claim 1, wherein said four polarizing mirrors of said one end portion are each arranged on respective slopes of a quadrangular pyramid.

3. A laser oscillation apparatus according to claim 2, wherein said optical axes are returned crossing each other by said four polarizing mirrors each arranged on the slopes of the quadrangular pyramid.

4. A laser oscillation apparatus according to claim 1, wherein said opposite end portion outputs a linear polarized beam inclined at an angle of 45° to a horizontal plane.

5. A laser oscillation apparatus according to claim 4, further comprising a ¼-wavelength mirror to circularly polarize said outputted linear polarized beam.

6. A laser oscillation apparatus for emitting a laser beam from a return-type resonator, comprising:

one end portion including four polarizing mirrors having optical axes which cross each other and forming four vertices of a square on a section perpendicular to the longitudinal direction of said optical axes, to reflect a laser beam; and an opposite end portion including two polarizing mirrors, to reflect the laser beam.

7. A laser oscillation apparatus according to claim 6, wherein said opposite end portion outputs a linear polarized beam inclined at an angle of 45° to a horizontal plane.

8. A laser oscillation apparatus according to claim 7, further comprising a ¼-wavelength mirror to circularly polarize said outputted linear polarized beam.

9. A laser oscillation apparatus according to claim 6, wherein said four polarizing mirrors of said one end portion are each arranged on respective slopes of a quadrangular pyramid.

10. A laser oscillation apparatus according to claim 9, wherein said optical axes are returned crossing each other by said four polarizing mirrors each arranged on the slopes of the quadrangular pyramid.

* * * * *